United States Patent [19]
Jeong et al.

[11] Patent Number: 5,663,851
[45] Date of Patent: Sep. 2, 1997

[54] SPINDLE HUB ASSEMBLY FOR A HARD DISK DRIVE HAVING A DISK-CLAMP SPACER FOR ABSORBING VIBRATIONS AND EVENLY DISTRIBUTING THE CLAMPING FORCES

[75] Inventors: Woo-cheol Jeong; Su-ik Hwang, both of Seoul, Rep. of Korea

[73] Assignee: SamSung Electronics Co., Ltd., Suwon, Rep. of Korea

[21] Appl. No.: 678,052

[22] Filed: Jul. 12, 1996

[30] Foreign Application Priority Data

Jul. 13, 1995 [KR] Rep. of Korea ............... 20647/1995

[51] Int. Cl.⁶ ........................................................ G11B 17/08
[52] U.S. Cl. ........................................................ 360/98.08
[58] Field of Search ............................ 360/97.01, 97.02, 360/98.08, 99.05, 99.12

[56] References Cited

U.S. PATENT DOCUMENTS

| | | |
|---|---|---|
| 4,755,981 | 7/1988 | Ekhoff . |
| 4,918,545 | 4/1990 | Scheffel . |
| 4,933,927 | 6/1990 | Ross . |
| 4,958,839 | 9/1990 | Guzik et al. . |
| 5,031,061 | 7/1991 | Hatch . |
| 5,048,005 | 9/1991 | Ekhoff . |
| 5,056,082 | 10/1991 | Ekhoff . |
| 5,101,306 | 3/1992 | Johnson . |
| 5,136,450 | 8/1992 | Moir . |
| 5,148,338 | 9/1992 | Frugé . |
| 5,155,640 | 10/1992 | Lee . |
| 5,189,577 | 2/1993 | Nishida et al. . |
| 5,274,517 | 12/1993 | Chen . |
| 5,295,029 | 3/1994 | Elsing et al. . |
| 5,305,163 | 4/1994 | Holm . |
| 5,392,178 | 2/1995 | Nishio et al. . |
| 5,422,768 | 6/1995 | Roehling et al. . |
| 5,458,940 | 10/1995 | Woo ........................................ 360/135 |
| 5,483,397 | 1/1996 | Gifford .................................. 360/97.01 |
| 5,490,024 | 2/1996 | Briggs et al. . |

*Primary Examiner*—A. J. Heinz
*Attorney, Agent, or Firm*—Robert E. Bushnell, Esq.

[57] ABSTRACT

An improved disk drive spindle hub assembly for a hard disk drive includes a spindle hub, a stack of information storage disks is journaled about the spindle hub in a spaced-apart, vertically aligned relation, annular spacers are positioned between adjacent ones of the information storage disks in order to space the disks apart in the vertically aligned relation of the spindle hub, a disk clamp configured to concentrically clamp the stack of information storage disks in axial alignment with the spindle hub, and a dummy disk formed an arrangement of a metal plate, a damping portion and a polyester film disposed between the disk clamp and the storage disk in order to absorb spurious vibrations and minimize stress concentrations and disk distortion when the storage disks are mounted for rotation within the hard disk drive.

15 Claims, 4 Drawing Sheets

SPINDLE HUB ASSEMBLY FOR A HARD DISK DRIVE HAVING A DISK-CLAMP SPACER FOR ABSORBING VIBRATIONS AND EVENLY DISTRIBUTING THE CLAMPING FORCES

CROSS-REFERENCE TO RELATED APPLICATIONS

This application makes reference to, incorporates the same herein, and claims all benefits accruing under 35 U.S.C. §119 from an application for Spindle Hub Assembly Of Hard Disk Drive earlier filed in the Korean Industrial Property Office on 13 Jul. 1995, and there duly assigned Ser. No. 20647/1995.

BACKGROUND OF THE INVENTION

1. Technical Field

The present invention relates to an improved spindle hub assembly for mounting storage disks for rotation within in a hard disk drive, and more particularly relates to an improved spindle hub assembly in which a dummy disk is used as a buffer between a disk clamp and storage disks to absorb spurious vibrations and minimize stress concentrations and disk distortion when the storage disks are mounted for rotation within the hard disk drive.

2. Background Art

Generally, disk drives can be grouped into magnetic disk drives such as a floppy disk drive and a hard disk drive which are used as an auxiliary memory in a computer, and optical disk drives such as a compact disk-read only memory (CD-ROM) and a magneto optical disk drive which are used as media in a multimedia environment including audio, video and alike.

In a hard disk drive used as an auxiliary memory for a computer, a magnetic head floating on a recording surface of the magnetic disk at a predetermined flying height operates for recording and reproducing data on the magnetic disk through magnetic flux. Accordingly, in order to increase data storage capacity of the magnetic disk drive and other data storage devices, it is of importance that a recording density of the magnetic information on the magnetic disk is enhanced, and that the magnetic disk drive is packaged with as many disk as possible.

As the recording density of magnetic disks is enhanced however, the flying height of the magnetic head becomes inversely minimal. A standard minimum flying height of the magnetic head is approximately 0.2 µm or so. Thus, the stability of the head flying height must be accurately maintained in order to realize a large capacity construction and high reliability of the magnetic disk drive. This requires a high degree of flatness of a rotating magnetic disk which can be ascribed to the way in which the disk is mounted to a hard disk spindle assembly. Such spindle assembly as disclosed, for example, in U.S. Pat. No. 5,295,029 for Disk Drive Including Unitary Deck For Aligning And Supporting Axially Retractable Spindle Assembly issued to Elsing et al., U.S. Pat. No. 5,189,577 for A Magnetic Disk Apparatus And A Motor Securement Therefor issued to Nishida et al., U.S. Pat. No. 5,136,450 for Disk Pack Assembly Having A Laminate Sleeve Disposed Between A Spindle And A Disc For Reducing Radial Disc Displacement issued to Moir, and U.S. Pat. No. 5,031,061 for Disk Drive Hub Assembly issued to Hatch, typically includes a rotatable spindle hub that is carded by a fixed spindle shaft securely mounted to the housing. A plurality of information storage disks are journaled about the spindle hub. Spacer disks are provided between adjacent information storage disks. The vertically aligned information storage disks are clamped to the spindle hub by a disk clamp secured by a plurality of screws.

In practice, the disk clamp design in relation with the hard disk spindle assembly is critical to high performance disk drives and there are several design criteria that must be met in order to provide an effective disk clamp. Specifically, the disk clamp must provide a uniform clamping force along its clamping surface to avoid problems such as top disk distortion. The disk damp must also be designed to uniformly distribute its internal stress in order to minimize clamping force variations due to thermal expansions. Many conventional disk clamp designs in which screws are used to secure the disk clamp to the spindle hub such as those disclosed in Elsing et al. '029, Nishida et al. '450, Moir '450, and Hatch '061, tend to loosen after time and stress imbalances within the clamp. Other convention disk clamp designs are disclosed, for example, in U.S. Pat. No. 5,305,163 for Stationary Angularly Aligned Stationary Spindle Shaft issued to Holm, U.S. Pat. No. 5,155,640 for Disk Spindle Motor Cap issued to Lee, U.S. Pat. No. 5,101,306 for Releasable Controlled Force Clamp For Disk Storage Apparatus issued to Johnson, U.S. Pat. No. 5,056,082 for Apparatus For Clamping Removable Disks and U.S. Pat. No. 5,048,005 for Spindle Clamp Having A Unitary Lock Member issued to Ekhoff also suffer similar drawbacks.

More recent disk clamp designs as disclosed, for example, in U.S. Pat. No. 5,490,024 for Disk Clamp Having An Annular Section Of Increased Rigidity issued to Briggs et al., U.S. Pat. No. 5,392,178 for Motor For A Disc Driving Device Having A Hub Positioned On Inner Race Of An Upper Bearing issued to Nishio et al., and U.S. Pat. No. 5,274,517 for Disk Clamp With Annular Spring Section issued to Chen are better served to provide a uniform clamping force and minimize stress concentrations within the disk clamp. For example, Chen '517 discloses a disk clamp that includes a substantially flat inner ring, an outer ring having a rounded engaging surface and a circular convex spring section that couples the inner ring section to the outer ring section. When installed on the top portion of the spindle hub by a plurality of screws through corresponding screw holes of the inner ring section, the disk clamp will contact at the rounded engaging surface of the dome-shaped resilient spring section in order to minimize adverse consequences to the disks. Similarly, Nishio et al. '178 also discloses a disk clamp that acts as a plate spring for securing the plurality of information storage disks to the spindle hub. In Nishio et al. '178 however, the disk clamp is secured to the spindle hub way a single screw, rather than a plurality of screws, mounted to a center bore of the spindle hub. In Briggs et al. '024, a disk clamp includes a raised circular wall around an outer radius of the clamp serving to increase the structural rigidity of the clamp in a single axial section of the claim in order to provide a stress barrier to the transmission of localized stresses from the screw points. Such conventional disk clamp designs for a spindle hub assembly, as I have observed however, continue to distort a clamping surface and cause deformity of the clamped storage disk over a time period when pressure asserted onto the storage disk by the disk clamp is uneven or too extreme. The disk distortion, of course, affects the flatness of the storage disk and alters the flying height of the magnetic head which ultimately attribute to the generation of operational errors during recording and reproduction of data.

SUMMARY OF THE INVENTION

Accordingly, it is therefore an object of the present invention to provide a novel disk spindle assembly of a hard disk drive that minimizes adverse influence imposed on the disk flatness when a single data storage disk or a stack of multiple data storage disks are mounted on a spindle assembly.

It is also an object of the present invention to provide a novel disk spindle assembly that minimizes stress concentrations and clamp force variations imposed by a disk clamp on a stack of information storage disks.

These and other objects can be achieved by an improved disk drive spindle hub assembly comprising a spindle hub, a stack of information storage disks is journaled about the spindle hub in a spaced-apart, vertically aligned relation, annular spacers are positioned between adjacent ones of the information storage disks in order to space the disks apart in the vertically aligned relation of the spindle hub, a disk clamp configured to concentrically clamp the stack of information storage disks in axial alignment with the spindle hub, annular spacers are configured to be resilient for enabling the information storage disks to expand and contract radially in relative to the spindle hub to avoid axial and radial displacements of the clamped information storage disks, and a dummy disk formed by an arrangement of a metal plate, a damping portion and a polyester film and disposed between the disk clamp and the storage disk in order to absorb spurious vibrations and minimize stress concentrations and disk distortion when the storage disks are mounted for rotation within the hard disk drive. The metal plate of the dummy disk is formed by stainless steel or aluminum and the damping portion is formed by a polymeric compound such as a visco-elastomer.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
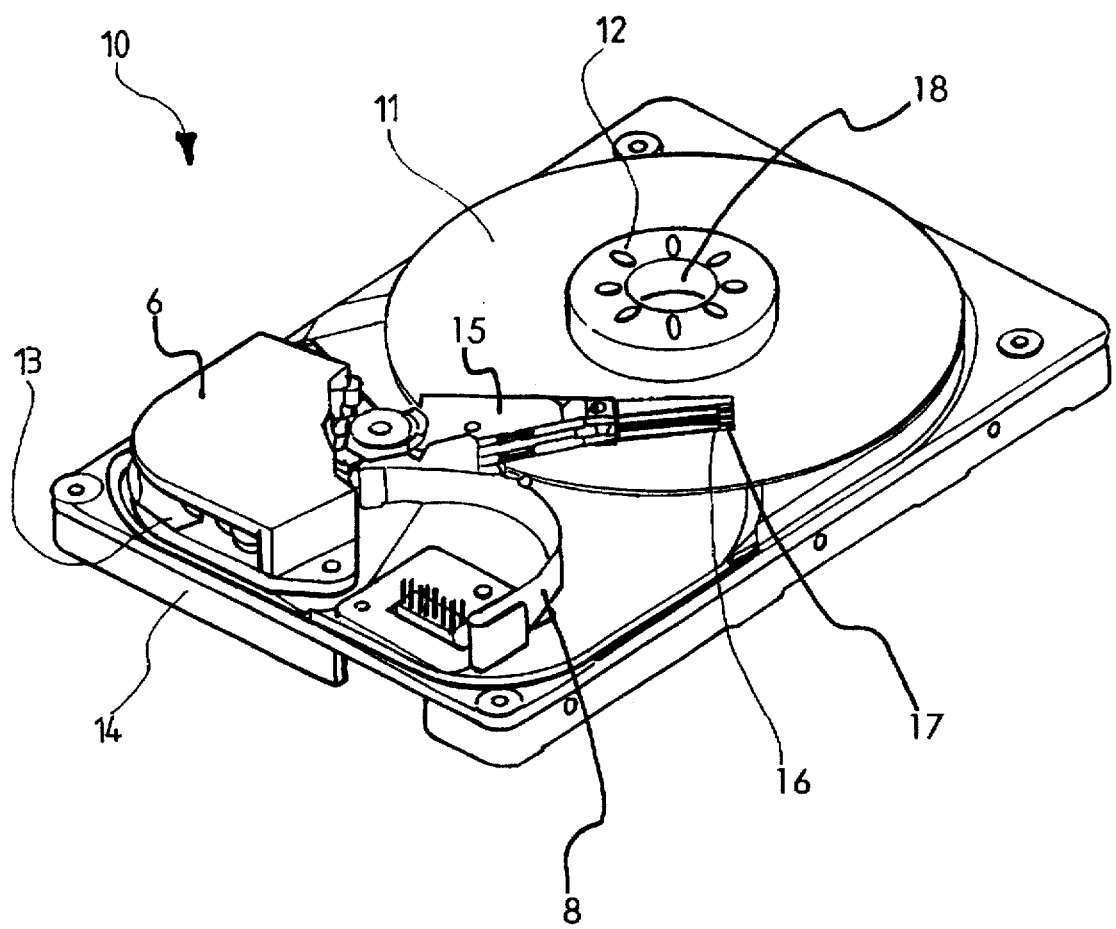
FIG. 1 is a perspective view illustrating a typical hard disk drive.

Referring now to the drawings and particularly to FIG. 1 which illustrates a typical hard disk drive 10 such as a Winchester-type suitable for use with a microcomputer. The hard disk drive 10 is typically constructed with a generally, rectangularly shaped base 14 serving as a frame providing a major interior surface accommodating a plurality of information storage disks 8 coaxially mounted in a stack upon a spindle hub assembly 18 driven by a motor (not shown) mounted on base 14 to provide a plurality of cylindrical base surfaces 9 that serve as a memory into which binary information may be written and read, an actuator 15 mounted upon base 14, a voice coil motor 6 positioned to respond to electrical control signals and thereby arcuately displace a proximal end of actuator 15, and a multi-lead flexible ribbon cable 8 electrically coupling arm with the corresponding terminal pins of terminal. Actuator arm 16 supports, at its distal end, a plurality of electromagnetic transducers commonly known as read/write actuator heads 17 corresponding to the distinct separate cylindrical base surfaces 9 of disks 11 that serves as memories.

Figure 2:
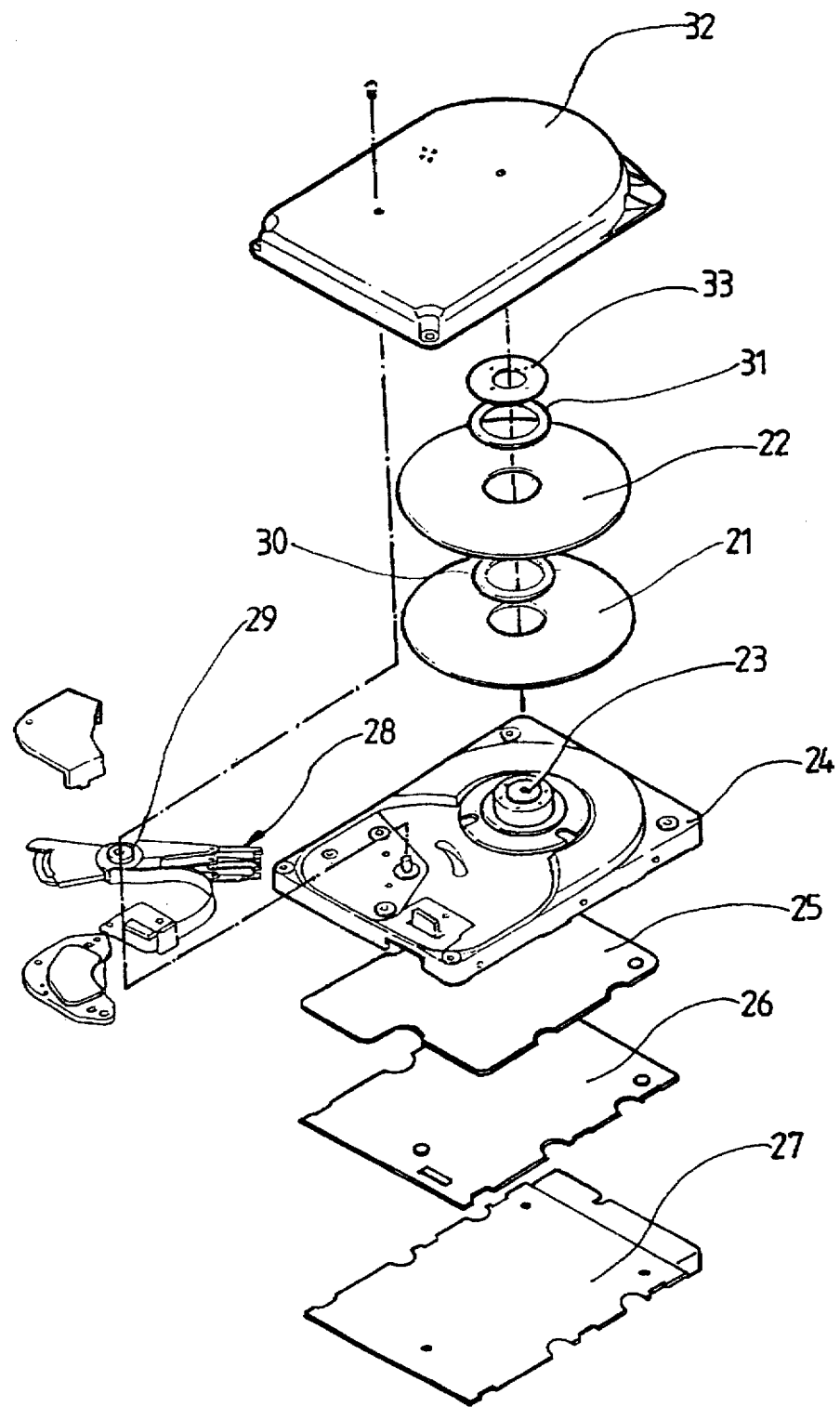
FIG. 2 is an exploded perspective view of the hard disk drive as shown in FIG. 1.

FIG. 2 illustrates an exploded perspective view of the hard disk drive shown in FIG. 1. In the embodiment of the hard disk drive chosen for the purpose of illustration, two information storage disks are utilized. The information storage disks 11 of FIG. 1 include a top storage disk 22 and a bottom storage disk 21. The spindle motor assembly includes a non-rotating spindle shaft (not shown) that is securely fastened to the frame 24. An actuator assembly 29 is installed to operate a magnetic head 28 to rotate at a predetermined angle. A printing circuit substrate 25, a protection plate 26 are positioned at the bottom of the frame 24 and are enclosed therein by a bottom cover 27. A rotatable spindle motor hub 23 is journaled about the spindle shaft. The spindle hub 23 includes an enlarged spindle base portion for supporting the bottom information storage disk 21 as the stack of information storage disks 11 are journaled about the spindle hub 23. A first spacer 30 which is sized appropriately to be tightly journaled about the spindle hub is then placed over the spindle motor hub 23 above the bottom information storage disk 21. The remaining information storage disk 22 is then placed over the spindle motor hub 10 with the first spacer 30 disposed between adjacent disks. The top information storage disk 22 and a second spacer 31 are successively placed about the spindle motor hub 23, and a disk clamp 33 is placed over the top of the second spacer 31. Disk clamp 33 is then secured to the top portion of the spindle motor hub 23 by a plurality of screws (not shown). Finally, when the disk clamp 33 is secured to the top portion of the spindle motor hub 23, a top cover 32 is screwed on the frame 24 to cover the disk drive.

Typically the disk clamp 33 as shown in FIG. 2 is annular and concentric about its radial axis. This type of disk clamp 33 may or may not include an annular central opening for a tight fit about the top portion of the spindle motor hub 23. Conventional disk clamp 33 usually includes a substantially flat inner plate and an extending circular convex spring section that serve as a plate spring for controlling application of downward pressure against the surface of the top information storage disk 22 through the second spacer 31 as the disk clamp 33 is secured to the top portion of the spindle motor hub 23. Such a typical spindle hub assembly, as I have observed however, suffer a number of drawbacks. First, the conventional disk clamp designs however effective, continue to distort a clamping surface and cause deformity of the clamped storage disk over a time period. The disk distortion, of course, affects the flatness of the storage disk and alters the flying height of the magnetic head which ultimately attribute to the generation of operational errors during recording and reproduction of data. Second, the spacer used to separate the disk clamp and the top information storage disk cannot sufficiently buffer the pressure asserted by the disk clamp. As a result, disk distortion continues to remain a problem in the art.

Figure 3:
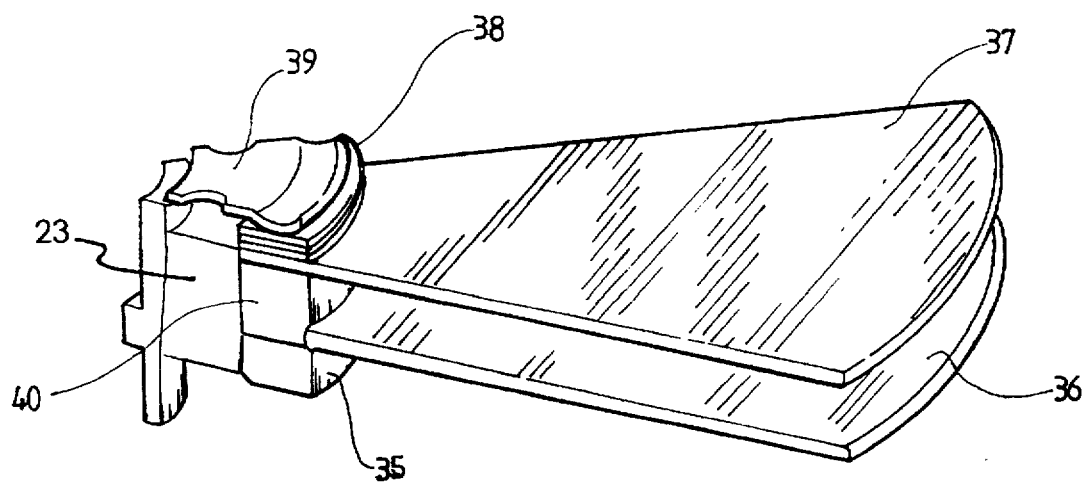
FIG. 3 is a cross-sectional view of a spindle hub assembly of a hard disk drive including a disk clamp for concentrically clamping a stack of information storage disk by way of a dummy disk according to the principles of the present invention.

Turning now to FIG. 3 which illustrates an improved spindle motor hub assembly of a hard disk drive constructed according to the principles of the present invention. A stack of information storage disks 36 and 37 is journaled about a spindle motor hub 23 separated by a spacer 40 disposed therein. A spacer 39 has an annular axial face for facing a surface of a top information storage disk 37 and a central circular opening that allows it to be placed over the top portion of the spindle motor hub 23. Spacer 39 should be resilient sufficiently so as to enable the information storage disks to expand and contract radially in relative to the spindle hub 23 in order to avoid axial and radial displacement of the clamped information storage disks.

A disk clamp 39 as contemplated by the present invention can be any available disk clamp conventional designed to provide a uniform clamping force along its clamping surface in order to minimize distortion of the top information storage disk and to uniformly distribute its internal stress in order to minimize clamping force variations due to thermal expansions. Before the disk clamp 39 is pressed down on the top information storage disk 37, however, a dummy disk 38 is inserted between clamp 39 and the top information storage disk 37. Here, unlike the conventional spacer used to inadequately absorb the clamping force asserted by the disk clamp 39, the dummy disk 38 as contemplated by the present invention can effectively buffer the pressure transmitted from the disk clamp 39 to the storage disks 36 and 37 when the disk clamp 39 is secured to the top portion of the spindle hub 23 by screws. In addition, the dummy disk 38 can also uniformly transmit pressure asserted from the disk clamp 39 without asserting concentrated stress on the storage disks.

Figure 4:
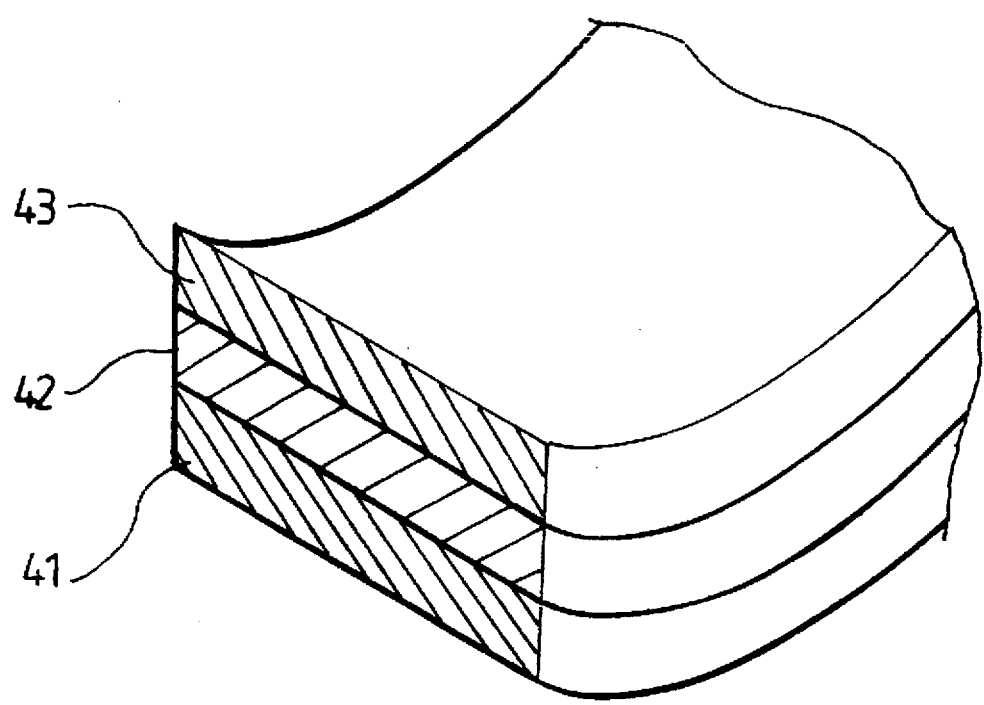
FIG. 4 is a cross-sectional perspective view of the dummy disk as shown in FIG. 3.

Referring now to FIG. 4 which illustrates a cross-sectional view of the circular dummy disk 38 as shown in FIG. 3. The dummy disk 38 used in lieu of the conventional spacer is intended to maximize the flatness of the disk surface and minimize adverse influence such as impact, external shocks and motor vibrations on the storage disks. The dummy disk 38 as constructed according to the principles of the present invention includes a metal plate 43 made of metallic material such as aluminum or stainless steel, a damping portion 42 made of polymeric compound such as visco-elastomer and a polyester film portion 41. The upper side of metal plate 43 is in direct contact with the disk clamp 39, and the lower side of polyester film 41 is in contact with a surface of the top information storage disk 37. Damping portion 42 as composed of the polymeric compound partially buffers the pressure transmitted from the disk clamp 39, and at the same time transmits the asserted pressure uniformly to the top information storage disk 37. Therefore, the concentration of stress generated by the concentration of pressure on parts of the hard disks is prevented, and the distortion of the hard disk is prevented.

As described above, the hard disk drive according to the present invention uses a dummy disk in conjunction with a locking structure of the hard disks in order to prevent disk distortion and thereby improving the reliability of the hard disks. The stress of the disk clamp is absorbed and scattered through the damping material of the dummy disk 38 in order to prevent any partial transformation or distortion of the storage disks. Thus, when the magnetic head moves across the hard disk, the flying height is maintained and when the magnetic head reads or writes on the disk, signal intensity remains constant. Accordingly, signal response is improved and the side of the hard disk adjacent to the disk clamp can also be used to write data which has a secondary effect of maximizing the data storage capacity of the hard disk even though the same hard disk as those used in a hard disk drive without a dummy disk is used. Furthermore, since the dummy disk buffers by absorbing impacts or vibrations applied to the spindle motor system, vibration-resistant and impact-resistant properties of the hard disk drive also improves.

While there have been illustrated and described what are considered to be preferred embodiments of the present invention, it will be understood by those skilled in the art that various changes and modifications may be made, and equivalents may be substituted for elements thereof without departing from the true scope of the present invention. For example, it should be appreciated that a wide variety of materials may be used to form the disk clamp. Further, the dimensions of the upwardly extending peripheral ring of the top portion of the spindle hub and the downwardly projecting peripheral ring of the disk clamp, as well as the number of screws used may be widely varied. Additionally, although the invention has been described in conjunction with its application to a particular Winchester-type disk drive, it should be appreciated that the disk drive spindle hub assembly described may be applicable to a wide variety of information storage devices. Therefore, it is intended that the present invention not be limited to the particular embodiment disclosed as the best mode contemplated for carrying out the present invention, but that the present invention includes all embodiments falling within the scope of the appended claims.

What is claimed is:

1. A disk drive spindle hub assembly, comprising:
    a spindle hub having a top portion and an enlarged spindle base;
    a stack of information storage disks journaled about said spindle hub in a spaced-apart, vertically aligned relation, said information storage disks being coupled to said spindle hub to rotate with said spindle hub;
    spacer means positioned between adjacent ones of said information storage disks, for spacing said disks apart in the vertically aligned relation of said spindle hub;
    a dummy disk having an annular axial face and a central circular opening concentrically disposed on said spindle hub, said annular axial face directly facing a surface of a top information storage disk, said dummy disk being formed by a lamination of a metal plate, a damping portion, and a polyester layer; and
    a disk clamp for concentrically clamping the stack of information storage disks in axial alignment with said spindle hub in compression against said dummy disk.

2. The disk drive spindle hub assembly of claim 1, further comprised of said metal plate being formed by stainless steel.

3. The disk drive spindle hub assembly of claim 1, further comprised of said metal plate being formed by aluminum.

4. The disk drive spindle hub assembly of claim 1, further comprised of said damping portion being formed by a polymeric compound.

5. The disk drive spindle hub assembly of claim 1, further comprised of said spacer means being resilient for enabling the information storage disks to expand and contract radially in relative to the spindle hub to avoid axial and radial displacements of the clamped information storage disks.

6. A disk drive spindle hub assembly, comprising:
    a spindle hub;
    a stack of information storage disks journaled about said spindle hub in a spaced-apart, vertically aligned relation;
    spacer means positioned between adjacent ones of said information storage disks, for spacing said disks apart in the vertically aligned relation of said spindle hub;
    a disk clamp for concentrically clamping the stack of information storage disks in axial alignment with said spindle hub; and a dummy disk having an annular axial face and a central circular opening concentrically disposed on said spindle hub, said annular axial face directly facing a surface of a top information storage disk and being compressed by said disk clamp when said disk clamp is screwed on the spindle hub for concentrically securing the stack of information storage disks to said spindle hub, said dummy disk being formed by a lamination of a metal plate, a damping portion, and a polyester film for absorbing the pressure asserted by said disk clamp when said disk clamp is screwed on the spindle hub.

7. The disk drive spindle hub assembly of claim 6, further comprised of said metal plate being formed by stainless steel.

8. The disk drive spindle hub assembly of claim 6, further comprised of said metal plate being formed by aluminum.

9. The disk drive spindle hub assembly of claim 6, further comprised of said damping portion being formed by a polymeric compound.

10. The disk drive spindle hub assembly of claim 6, further comprised of said spacer means being resilient for enabling the information storage disks to expand and contract radially in relative to the spindle hub to avoid axial and radial displacements of the clamped information storage disks.

11. A disk drive system, comprising:
a spindle hub;
means for rotating said spindle hub about a spindle axis;
a stack of information storage disks journaled about said spindle hub in a spaced-apart, vertically aligned relation;
a plurality of magnetic transducer heads for writing information onto the information storage disks and for reading information out from the information storage disks;
a head actuator assembly for positioning the transducers relative to the information storage disks;
a dummy disk having an annular axial face and a central circular opening concentrically disposed on said spindle hub, said annular axial face directly facing a surface of a top information storage disk said dummy disk being formed by a lamination of a metal plate, a damping portion, and a polyester layer; and
a disk clamp for concentrically clamping the stack of information storage disks in axial alignment with said spindle hub, said disk clamp having a downwardly projecting peripheral ring of a predetermined diameter having a bottom surface facing a surface of said dummy disk, when said disk clamp is screwed on the spindle hub for concentrically securing the stack of information storage disks to said spindle hub.

12. The disk drive system of claim 11, further comprised of said metal plate being formed by stainless steel.

13. The disk drive system of claim 11, further comprised of said metal plate being formed by aluminum.

14. The disk drive system of claim 11, further comprised of said damping portion being formed by a polymeric compound.

15. The disk drive system claim 11, further comprised of said spacer means being resilient for enabling the information storage disks to expand and contract radially in relative to the spindle hub to avoid axial and radial displacements of the clamped information storage disks.

* * * * *